United States Patent [19]

Johann et al.

[11] Patent Number: 4,960,705

[45] Date of Patent: Oct. 2, 1990

[54] PROCESS FOR THE FILTRATION OF THICKENED CORN GLUTEN

[75] Inventors: Peter Johann, Darmstadt; Georg Winkler, Bad Salzuflen, both of Fed. Rep. of Germany

[73] Assignee: Rohm GmbH Chemische Fabrik, Darmstadt, Fed. Rep. of Germany

[21] Appl. No.: 63,088

[22] Filed: Jun. 17, 1987

[30] Foreign Application Priority Data

Jun. 25, 1986 [DE] Fed. Rep. of Germany ....... 3621220

[51] Int. Cl.$^5$ .............................................. C07K 3/12
[52] U.S. Cl. .................................... 435/272; 435/262; 426/18; 426/14
[58] Field of Search ............... 435/262, 272, 274, 275, 435/277, 945; 426/54, 49, 53; 127/55

[56] References Cited

U.S. PATENT DOCUMENTS 3,928,631 12/1975 Freeman et al. .
3,958,015 5/1976 Gay .............................. 426/18
4,233,406 11/1980 Wieg et al. .................... 435/272 X
4,795,101 1/1989 Silver ............................ 241/12

FOREIGN PATENT DOCUMENTS 0001470 4/1979 European Pat. Off. .
1244288 8/1971 United Kingdom .

OTHER PUBLICATIONS

Malmos, AICHE Symposium Series, vol. 74, No. 172, (1978) pp. 93–99.
Wilke et al., "Enzymatic Hydrolysis of Cellulose", Noyes Data Corp., Park Ridge, N.J., 1983, pp. 5–15.
Starch: Chemistry and Technology, Second Edition, 1984, Stanley A. Watson, pp. 452–455, Academic Press, Inc.
Rohm, Enzyme Technology, "Determination of Cellulase–Units", Jun. 20, 1988, FR-5-05-E, pp. 2–6.
Rohm Enzyme Technology, "Determination of the Xylanase–Activity by the Method According to Somogyi and Nelson", pp. 2–5.

Primary Examiner—Sam Rosen
Attorney, Agent, or Firm—Oblon, Spivak, McClelland, Maier & Neustadt

[57] ABSTRACT

The filtration of thickened gluten which is obtained as by-product during the production of corn starch can be improved by the reaction of an amylase- and proteinase-activity-free xylanase, hemicellulase and/or glucanase and leads to more rapid draining and retention of the starch content of the thickened gluten.

7 Claims, No Drawings

PROCESS FOR THE FILTRATION OF THICKENED CORN GLUTEN

BACKGROUND OF THE INVENTION

1. Field of the Invention

The invention concerns a process for the filtration of thickened gluten with the addition of enzymes before or during filtration.

2. Discussion of the Background:

In the process of the production of corn starch the protein components of the corn, i.e., the gluten, have to be separated. This is done after the wet grinding of corn by a succession of steps for the removal of germ and fibrous matter and the centrifuging of the starch, whereby a fraction of gluten and mechanically damaged starch particles is obtained as the centrifuge product. This fraction is called thickened gluten. It is drained on drum filters, dried and used as protein-rich cattle feed.

The filtration of thickened gluten often presents problems. The water is tenaciously retained so that very little filtrate is obtained, the drying of which requires a large amount of heat energy. This problem is attributed to the swelling of the starch contained in the thickened gluten.

In U.S. Pat. No. 3,928,631, highly branched, partially insoluble polysaccharides are thought to be responsible for the filtration problems. By the addition of glucamylase to the thickened gluten at least one hour before the start cf filtration, the starch is decomposed to a large extent and the filtration properties considerably improved. However, the amylase treatment has the disadvantage that the starch which would have remained in the residue as a valuable feed component is lost in the form of dissolved dextrin and sugar. The filtrate is re-used, in part, for the swelling of the corn. In this manner the amylase contained in the filtrate gets into the ground matter and affects the decomposition of starch, which causes another portion of it to be lost. A further part of the filtrate is thrown out and puts a burden on the wastewater treatment due to its content of starch decomposition products.

SUMMARY OF THE INVENTION

Accordingly, one object of the present invention is to provide a method of filtering thickened gluten which prevents the loss of valuable starch.

Another object of the invention is to provide a method of filtering thickened gluten which does not result in waste products which contain starch decomposition products and therefore represent a burden on wastewater treatment facilities.

These and other objects of the present invention which will become apparent from the specification have been achieved by the present process for filtering thickened gluten, which comprises the steps of (a) adding a filtration improving amount of at least one enzyme selected from the group consisting of xylanases, hemicellulases, glucanases and mixtures thereof to the thickened gluten;

(b) reacting said enzyme and the thickened gluten for a period of time sufficient to improve filtration of the gluten, to produce a reacted gluten; and (c) filtering said reacted gluten.

DETAILED DESCRIPTION OF THE PREFERRED EMBODIMENTS

The invention is related to the problem of avoiding difficulties in the filtration of thickened gluten, while preventing the loss of starch and a burden on wastewater treatment. It has been found that this goal can be attained by an enzymatic treatment of the thickened gluten before or during the filtration if a xylanase, a hemicellulase and/or a glucanase which is free of amylases and proteinases is used.

This result is surprising as corn contains only a very small amount of swelling agents with a hemicellulose structure and it had not been known that these types of swelling agents are contained in the thickened gluten. Without limiting the invention to a particular theory, it is believed that the starch contained in the thickened gluten or starchlike insoluble polysaccharides are not the actual cause of the filtration problem, but that swelling agent-like structures are only formed by an interaction between the small portion of hemicellulose and the starch particles or the insoluble polysaccharides, which then produce the described filtration problems. This would explain the reason for the fact that by the decomposition of the starch as well as the decomposition of the so far not recognized hemicelluloses, the formation of these swelling agents is prevented and the filtration problems can be eliminated.

Enzyme preparations which have a sufficient xylanase, hemicellulase and/or glucanase activity are known and commercially available. They can be obtained from bacteria or mold fungi, such as Trichoderma cultures, for example. The required activities can also be present as auxiliary activities in addition to another main activity, as long as the latter is not harmful to the procedure. The enzyme preparation must be free of amylase and proteinase activity at the pH value of the thickened gluten, i.e., 3.5-4.5, as otherwise an undesirable decomposition of the starch and gluten would occur. Trace levels of these activities, which can be shown in most enzyme preparations, are harmless, however, as they do not cause any appreciable decomposition of starch and gluten. In the same manner, amylases and proteases which are only active outside of the pH range of the thickened gluten are generally harmless to the procedure and may be present.

The amount of the enzymes used according to the invention is very small and has no economical influence considering the retention of the starch component in the thickened gluten. The enzymes should be present in amounts sufficient to improve the filterability of the thickened gluten and should have sufficient activity so that long reaction times are not needed. Enzyme preparations with a xylanase activity of 50 to 10,000 UXyl/g at pH 3.5-4.5 are preferably used in an amount of 0.05 to 10 kg/ton dry gluten substance. A reaction time of 30 to 60 minutes at 35 to 45° C. is preferred. The residence time for the thickened gluten in the filtration apparatus can be calculated into the treatment time so that with a sufficiently long residence time, the enzyme may be added concurrently with the gluten into the filtration apparatus.

The effect of the enzymes used according to the invention lags somewhat behind that of glucamylase. A solid matter content at least 0.5% higher is attained in the residue and at least 5% more filtrate. Although this improvement is of economic importance, even better results are obtained in the usual case, e.g., an increase of the solid matter content by 1 to 3% and an increase in the filtrate amount by 10 to 30%. This not only improves the food value of the gluten feed, but also reduces the energy need for drying.

Other features of the invention will become apparent during the course of the following descriptions of exemplary embodiments which are given for illustration of the invention and are note intended to be limiting thereof.

EXAMPLES

Procedure

A homogenized gluten suspension is warmed while stirring to 40° C. The enzyme to be tested is added in an amount of 0.24% (relative to the dry gluten substance) and reacted for 30 minutes. An exactly defined amount (150.0 g) of the suspension is filtered under vacuum for exactly 2 minutes and the amount of filtrate determined. Subsequently filtration is done under vacuum for exactly one more minute and the amount of filtrate again determined. To determine the remaining moisture, 10 g of the residue are rubbed together with 10 g of beach sand and dried at 120° C to constant weight to determine the dry matter content.

Filtration tests

Example 1) - Filtration at 20 torr

After the reaction time, filtration was done under vacuum for 2 and 3 minutes.

| Enzyme | Filtrate after 2 min. | | Filtrate after 3 min. | | Dry substance in residue |
|---|---|---|---|---|---|
| | (g) | (%) | (g) | (%) | (% by weight) |
| blank value without enzyme mold fungus | 38.7 | 100 | 47.9 | 100 | 26.4 |
| hemicellulase (1) | 41.3 | 106.7 | 50.7 | 105.9 | 28.0 |
| hemicellulase (2) | 42.8 | 110.6 | 53.7 | 112.1 | 28.7 |
| hemicellulase (3) | 48.9 | 126.4 | 59.9 | 125.1 | 29.3 |

Preparation 1 had an activity of 330 CU/mg and 610 UXyl/g and resulted in a 6.7% increase in the amount of filtrate. Preparation 2 had an activity of 100 CU/mg and 3000 UXyl/g and resulted in 10.6% increase in the amount of filtrate. A special combination of xylanase and hemicellulase, 1500 CU/mg and 120 UXyl/g in preparation 3 provided after 2 minutes a 26.4% increase in filtrate yield.

Example 2) - Filtration at 16 torr

The same parameters as in Example 1 were used.

| Enzyme | Filtrate after 2 min. | | Filtrate after 3 min. | |
|---|---|---|---|---|
| | (g) | (%) | (g) | (%) |
| blank value without enzyme mold fungus | 42.0 | 100 | 51.7 | 100 |
| cellulase (1) | 45.5 | 108.5 | 55.9 | 108.1 |
| cellulase (2) | 51.2 | 122.0 | 63.5 | 122.9 |
| cellulase (3) | 56.4 | 134.4 | 68.5 | 132.5 |

It can be seen that the sequence of the enzyme effectiveness remains the same.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. A process for filtering thickened corn gluten, comprising the steps of:
   (i) adding a filtration improving amount of an enzyme selected from the group consisting of xylanases, hemicellulases, glucanases, and mixtures thereof to the thickened corn gluten, wherein said enzyme is substantially free of amylase and proteinase activity at the pH value of the thickened corn gluten;
   (ii) reacting said enzyme and the thickened corn gluten for a period of time sufficient to improve filtration of the gluten, to produce a reacted gluten; and
   (iii) filtering said reacted gluten.

2. The process of claim 1, wherein said enzyme is substantially free of amylase and proteinase activity at a pH value of about 3.5–4.5.

3. The process of claim 1, wherein said enzyme has an activity of about 50–10,000 UXyl/g at a pH of about 3.5–4.5.

4. The process of claim 1, wherein said enzyme is added in an amount of about 0.05–10 kg/ton dry gluten.

5. The process of claim 1, wherein said reacting step is conducted for 30–60 minutes.

6. The process of claim 1, wherein said reacting step is conducted at a temperature between about 35–45° C.

7. The process of claim 1, wherein said enzyme is isolated from a Trichoderma culture.

* * * * *